UNITED STATES PATENT OFFICE.

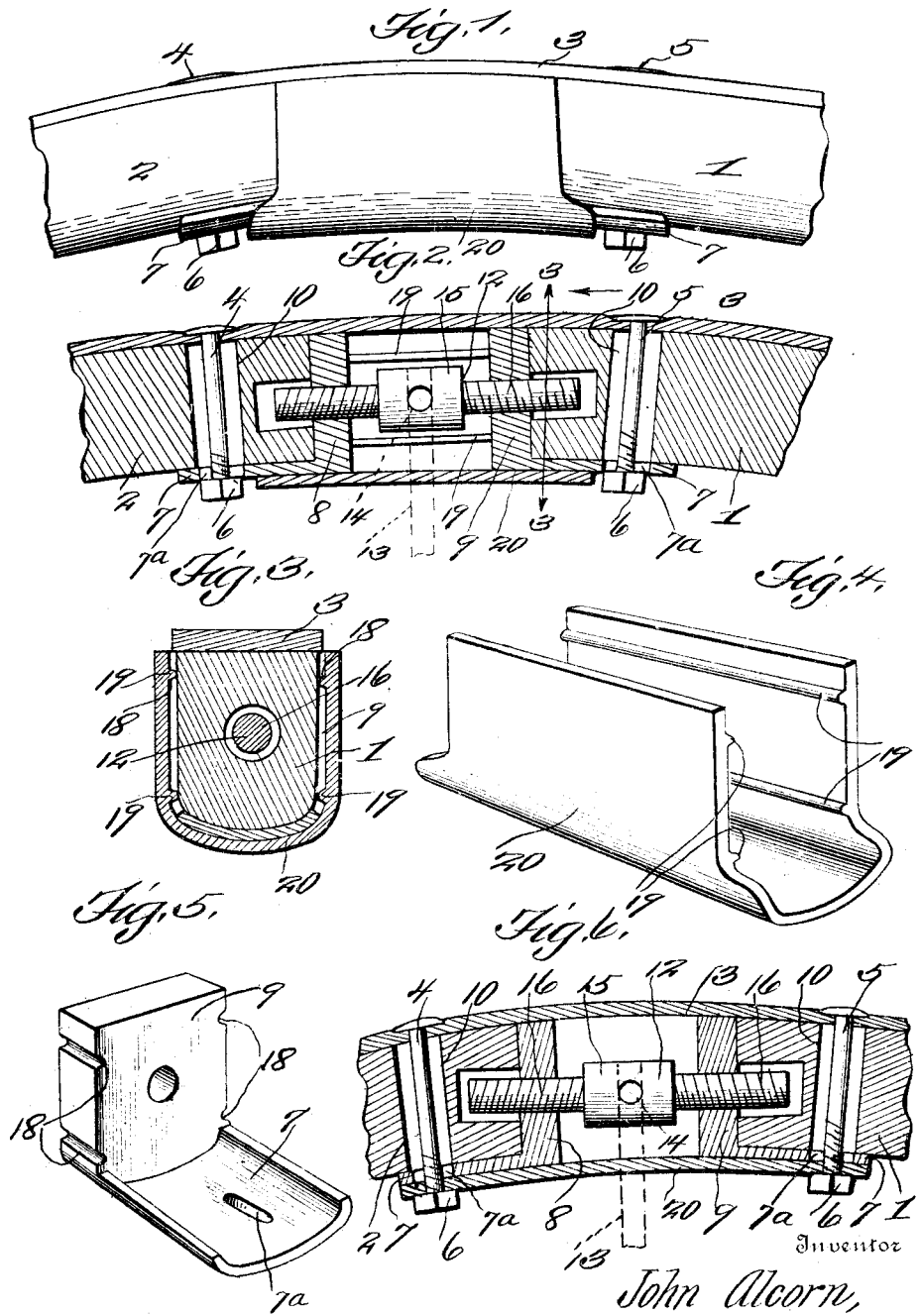

JOHN ALCORN, OF MECCA, INDIANA.

TIRE-TIGHTENER.

1,053,142.  Specification of Letters Patent.  Patented Feb. 18, 1913.

Application filed July 13, 1912. Serial No. 709,146.

*To all whom it may concern:*

Be it known that I, JOHN ALCORN, a citizen of the United States, residing at Mecca, in the county of Parke and State of Indiana, have invented a new and useful Tire-Tightener; and I do hereby declare the following to be a full, clear, and exact description of the invention, such as will enable others skilled in the art to which it appertains to make and use the same.

This invention relates to a new and useful tire tightener.

As one of the objects of the invention it is the aim to provide a device of this nature, in which various simple, efficient, desirable and practical features of construction are involved.

Another object of the invention is the provision of a cover plate U-shaped in cross section to fit the felly, and adapted to be removed to adjust the tire tightener. This cover plate has a slight limited movement between the nuts of the bolts, which hold the tire to the felly, one or the other of which nuts and the corresponding bolt is adapted to be removed, in order that the cover plate may be removed.

In the drawings there is disclosed certain features, but in practical fields these features may necessitate alterations, to which the patentee is entitled, provided the alterations are comprehended within the scope of what is claimed.

The invention comprises further features and combination of parts, as hereinafter set forth, shown in the drawings, and claimed.

In the drawings:—Figure 1 is a view in side elevation showing the improved tire tightener constructed in accordance with the invention. Fig. 2 is a central longitudinal sectional view. Fig. 3 is a cross sectional view. Fig. 4 is a detail view of the cover plate. Fig. 5 is a detail view of one of the angled members, to which the cover plate is slidably connected. Fig. 6 is a central longitudinal sectional view showing the cover plate connected to the felly in a different manner.

Referring more particularly to the drawings 1 and 2 designate the two ends of the felly, while 3 denotes the tire, which is fastened to the felly by the bolts 4 and 5 having nuts 6. The bolts 4 and 5 also pass through the horizontal portions 7 of the angled members 8 and 9. The openings 10 of the felly through which the bolts pass are elongated, so that when the felly spreader 12 is operated by a key 13 shown in dotted lines, the ends of the felly will move relative to the bolt. The horizontal portions 7 are provided with slots 7ª, which register with the openings 10 of the felly, so that the horizontal portion 7 may move relative to the bolts. The key 13 is adapted to extend through an aperture 14 of the enlargement 15 of the spreader, so that the spreader may be slightly rotated. Projecting from each side of the enlargement of the spreader is a shank 16. These shanks are provided with right and left screw threads, so that when the spreader is rotated, the ends of the felly will be separated. The shanks 16 are threaded into the vertical portions of the angled members.

The side edges of the vertical portions of the angled members are provided with slight recesses 18, which receive ribs 19 upon the inner face of the U-shaped slide plate, in order to hold the cover plate in position. However, before one or the other of the bolts 4 and 5 is arranged in position, the cover plate 20 is disposed so its ribs will be received by the recesses 18, and after the cover plate has been properly positioned the second bolt of the bolts 4 and 5 is disposed in place, and its respective nut threaded thereon. The cover plate, as will be discerned, is allowed play between the nuts of the bolts 4 and 5. To remove the cover plate, one or the other of the bolts 4 and 5, and its respective nut is removed, after which the plate may be withdrawn. However, in Fig. 6 the recesses 18 and the ribs 19 are omitted.

From the foregoing it will be noted there has been devised a simple and efficient tire tightener, and one which has been found practical.

The invention having been set forth, what is claimed as new and useful is:—

In combination, a felly having its adjacent ends separated, a tire on the felly, angled members disposed against the adjacent ends of the felly, the felly having elongated openings, bolts passing through the tire, the openings of the felly and the angled members, a device having right and left threaded shanks threaded in the angled members and adapted to be rotated to separate the adjacent ends of the felly, a U-shaped cover plate fitting the felly to shield the angled members and provided with ribs upon the inner side faces thereof, the angled members having their side edges provided with recesses to receive the ribs, the U-shaped cover plate having limited play between the nuts of the bolts.

In testimony whereof I have signed my name to this specification in the presence of two subscribing witnesses.

JOHN ALCORN.

Witnesses:
  OLIVER HIXON,
  A. H. BRADFIELD.